(12) United States Patent
Caronia et al.

(10) Patent No.: US 6,656,986 B2
(45) Date of Patent: Dec. 2, 2003

(54) POLYETHYLENE CROSSLINKABLE COMPOSITION

(75) Inventors: Paul Joseph Caronia, Annandale, NJ (US); Jeffrey Morris Cogen, Flemington, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 426 days.

(21) Appl. No.: 09/797,147

(22) Filed: Mar. 1, 2001

(65) Prior Publication Data

US 2002/0169238 A1 Nov. 14, 2002

(51) Int. Cl.$^7$ .................................................. C08K 5/34
(52) U.S. Cl. .................... 524/101; 524/236; 525/333.8; 525/375
(58) Field of Search .................. 524/236, 101; 525/333.8, 375

(56) References Cited

U.S. PATENT DOCUMENTS 6,187,847 B1    2/2001    Cogen et al. ................ 524/101

FOREIGN PATENT DOCUMENTS

| JP | 99-132114 | 5/1997 |
| WO | WO99/21194 | 4/1999 |
| WO | WO9924504 | 5/1999 |

*Primary Examiner*—Peter D. Mulcahy

(57) ABSTRACT

A composition comprising:
- (a) polyethylene;
- (b) as a scorch inhibitor, [1,3,5-tris(4-tert-butyl-3-hydroxy-2,6-dimethylbenzyl)-1,3,5-triazine-2,4,6-(1H,3H,5H)-trione];
- (c) a thioester;
- (d) a hindered amine stabilizer; and
- (e) an organic peroxide.

11 Claims, No Drawings

POLYETHYLENE CROSSLINKABLE COMPOSITION

TECHNICAL FIELD

This invention relates to polyethylene compositions useful in the preparation of cable insulation, semiconducting shields, and jackets.

BACKGROUND INFORMATION

A typical electric power cable generally comprises one or more conductors in a cable core that is surrounded by several layers of polymeric materials including a first semiconducting shield layer (conductor or strand shield), an insulating layer, a second semiconducting shield layer (insulation shield), a metallic tape or wire shield, and a protective jacket. Additional layers within this construction such as moisture impervious materials are often incorporated. Other cable constructions such as plenum and riser cable omit the shield.

In many cases, crosslinking of the polymeric materials is essential to the particular cable application, and, in order to accomplish this, useful compositions generally include a polymer; a crosslinking agent, usually an organic peroxide; and antioxidants; and, optionally, various other additives such as a scorch inhibitor or retardant and a crosslinking booster. Crosslinking assists the polymer in meeting mechanical and physical requirements such as improved high temperature properties.

The crosslinking of polymers with free radical initiators such as organic peroxides is well known. Generally, the organic peroxide is incorporated into the polymer by melt blending in a roll mill, a biaxial screw kneading extruder, or a Banbury™ or Brabender™ mixer at a temperature lower than the onset temperature for significant decomposition of the peroxide. Peroxides are judged for decomposition based on their half life temperatures as described in Plastic Additives Handbook, Gachter et al, 1985, pages 646 to 649. An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

Polymers containing peroxides are vulnerable to scorch (premature crosslinking occurring during the extrusion process). Scorch causes the formation of discolored gel-like particles in the resin and leads to undesired build up of extruder pressure during extrusion. Further, to achieve a high crosslink density, high levels of organic peroxide have often been used. This leads to a problem known as sweat-out, which has a negative effect on the extrusion process and the cable product. Sweat-out dust is a potential explosion hazard, may foul filters, and can cause slippage and instability in the extrusion process. The cable product exposed to sweat-out may have surface irregularities such as lumps and pimples, and voids may form in the insulation layer.

It is known that phenolic compounds can reduce scorch during extrusion of peroxide-containing insulation materials. Gustafsson et al, Die Angewandte Makromolekulare Chemie 261/262, 1998, pages 93 to 99, studied the effect of degree of steric hindrance of phenolic compounds on scorch inhibition and antioxidant capability in peroxide crosslinked polyethylene. Gustafsson et al teach that the less hindered the phenol is, the more effective it is as a scorch inhibitor. In addition, they teach that those phenols that provide the highest level of scorch inhibition are least effective as stabilizers. Furthermore, they teach that the less hindered the phenol is, the higher is the non-productive consumption of peroxide, leading to a higher peroxide requirement to achieve a desired level of cure. In U.S. patent application, Ser. No. 09/098,179, filed on Jun. 16, 1998 (D-17873), a scorch retarding semi-hindered phenol is described. Although the additive imparts scorch resistance, it does so at the expense of crosslinking density, requiring either excess peroxide or use of a cure booster in order to achieve adequate crosslinking. Both of these are undesirable since higher peroxide levels result in higher peroxide sweat out, and the use of a cure booster complicates the manufacturing process due to increased formulation complexity.

Industry is constantly seeking to find polyethylene crosslinking compositions which can be extruded at high temperatures (although limited by the decomposition temperature of the organic peroxide) and rates with a minimum of scorch and yet be crosslinked at a fast cure rate to a high crosslink density, all without the requirement of excess peroxide or cure boosters, and without sacrificing long-term heat aging stability, without sacrificing electrical properties, and without having additive bloom (or sweatout).

DISCLOSURE OF THE INVENTION

An object of this invention, therefore, is to provide a polyethylene composition with a scorch inhibitor, which minimizes scorch, and maximizes crosslink density without requiring excess peroxide or a cure booster, and without the above mentioned deficiencies. Other objects and advantages will become apparent hereinafter.

According to the invention, such a composition has been discovered. The composition comprises:

(a) polyethylene;

(b) as a scorch inhibitor, [1,3,5-tris(4-tert-butyl-3-hydroxy-2,6-dimethylbenzyl)-1,3,5-triazine-2,4,6-(1H,3H,5H)-trione];

(c) a thioester;

(d) a hindered amine stabilizer; and (e) an organic peroxide.

This composition is considered to be an improvement over U.S. patent application Ser. No. 09/359,228 filed on Jul. 22, 1999 (D-17973).

It will be understood that one or more of components (a), (c), (d), and (e) can be present in the composition if desired. In certain cases, additional scorch inhibitors may also be desirable.

DESCRIPTION OF THE PREFERRED EMBODIMENT(S)

Polyethylene, as that term is used herein, is a homopolymer of ethylene or a copolymer of ethylene and a minor proportion of one or more alpha-olefins having 3 to 12 carbon atoms, and preferably 4 to 8 carbon atoms, and, optionally, a diene, or a mixture or blend of such homopolymers and copolymers. The mixture can be a mechanical blend or an in situ blend. Examples of the alpha-olefins are propylene, 1-butene, 1-hexene, 4-methyl-1-pentene, and 1-octene. The polyethylene can also be a copolymer of ethylene and an unsaturated ester such as a vinyl ester, e.g., vinyl acetate or an acrylic or methacrylic acid ester.

The polyethylene can be homogeneous or heterogeneous. The homogeneous polyethylenes usually have a polydispersity (Mw/Mn) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. Mw is defined as weight average molecular weight and Mn is defined as number average molecular weight. The polyethylenes can have a density in the range of 0.860 to 0.950 gram per cubic centimeter, and preferably have a density in the range of 0.870 to about 0.930 gram per cubic centimeter. They also can have a melt index in the range of about 0.1 to about 50 grams per 10 minutes.

The polyethylenes can be produced by low or high pressure processes. They can be produced in the gas phase, or in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 gram per cubic centimeter and metallocene copolymers with densities less than 0.900 gram per cubic centimeter. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250 ° C.° C., and in the tubular reactor, the pressure is in the range of about 25,000 to about 45,000 psi and the temperature is in the range of about 200 to about 350° C. Blends of high pressure polyethylene and metallocene resins are particularly suited for use in the application, the former component for its excellent processability and the latter for its flexibility.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms, The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and EPDMs, respectively. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 3 to about 8 grams per 10 minutes. The alpha-olefins can be the same as those mentioned above, and the catalysts and processes are also the same subject to variations necessary to obtain the desired densities and melt indices.

As noted, included in the definition of polyethylene are homopolymers of ethylene made by a conventional high pressure process. The homopolymer preferably has a density in the range of 0.910 to 0.930 gram per cubic centimeter. The homopolymer can also have a melt index in the range of about 1 to about 5 grams per 10 minutes, and preferably has a melt index in the range of about 0.75 to about 3 grams per 10 minutes. Melt index is determined under ASTM D-1238, Condition E. It is measured at 190 ° C. and 2160 grams.

The scorch inhibitor is [1,3,5-tris(4-tert-butyl-3-hydroxy-2,6-dimethylbenzyl)-1,3,5-triazine-2,4,6-(1H,3H,5H)-trione]. This compound also functions as a primary antioxidant.

Although a cure booster is not required to achieve adequate crosslinking, one or more cure boosters can be included in the composition of the invention, if desired. The cure (crosslinking) booster can be any one, or a mixture, of the cure boosters known in the prior art. For example, it can be an ester, ether, ketone, cyanurate, isocyanurate, phosphate, ortho formate, aliphatic or aromatic ether containing at least 2, and preferably 3, unsaturated groups such as allyl, vinyl, or acrylate. The number of carbon atoms in the cure booster can be in the range of 9 to 40 or more, and is preferably 9 to 20. Specific examples are triallyl cyanurate (TAC); triallyl-1,3,5-triazine-2,4,6(1H,3H,5H)-trione also known as triallyl isocyanurate (TAIC); triallyl phosphate; triallyl ortho formate; tetra-allyloxy-ethane; triallyl benzene-1,3,5-tricarboxylate; diallyl phthalate; zinc dimethacrylate; ethoxylated bisphenol A dimethacrylate; methacrylate terminated monomer with average chain length of $C_{14}$ or $C_{15}$; pentaerythritol tetraacrylate; dipentaerythritol pentaacrylate; pentaerythritol triacrylate; dimethylolpropane tetraacrylate; ethoxylated trimethylolpropane triacrylate; trimethylolpropane triacrylate; and 2,4,6-triallyl-1,3,5-trione; 2,4-diphenyl-4-methyl-1-pentene; triallyl trimellitate (TATM); 3,9-divinyl-2,4,8,10-tetraoxaspiro[5.5]undecane (DVS). Also see U.S. Pat. No. 4,018,852.

The organic peroxide preferably has a decomposition temperature of 100 to 220 degrees C. for a half-life of 10 minutes and can be exemplified by the following compounds [the numbers set off by the parentheses are their decomposition temperatures (in degrees C.)]: succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2,5-di(t-butyl-peroxy)hexane (155), t-butyl cumyl peroxide (155), t-butyl hydroperoxide (158), di-t-butyl peroxide (160), 2,5-dimethyl-2,5-di(t-butyl peroxy)hexane-3 (170), and alpha, alpha'-bis-t-butylperoxy-1,4-diisopropylbenzene (160).

Based on 100 parts by weight of polyethylene, the proportions of the compounds can be about as follows (in parts by weight):

| Component | Broad Range | Preferred Range |
| --- | --- | --- |
| (b) scorch inhibitor | 0.01 to 1 | 0.05 to 0.3 |
| (c) thioester | 0.05 to 5 | 0.1 to 0.3 |
| (d) HAS | 0.002 to 0.1 | 0.004 to 0.025 |
| (e) organic peroxide | 0.04 to 3 | 0.6 to 2.0 |

It should be understood that these proportions can vary outside of the above ranges depending on the desired properties.

The composition of the invention can be processed in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 120 to about 260° C., and preferably in the range of about 170 to about 220° C.

The extrudate is then crosslinked by exposing it to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction.

Conventional additives can be added to the polymer either before or during processing. The amount of additive is usually in the range of about 0.01 to about 50 percent by weight based on the weight of the resin, the higher percentages generally relating to fillers and fire retardants. Useful additives are additional antioxidants, ultraviolet absorbers, antistatic agents, pigments, carbon black, dyes, fillers, slip agents, fire retardants, plasticizers, processing aids, lubricants, stabilizers, smoke inhibitors, halogen scavengers, flow aids, lubricants, water tree inhibitors such as polyethylene glycol, and viscosity control agents. In certain cases it may also be desirable to add one or more auxiliary scorch inhibitors (in addition to the [1,3,5-tris(4-tert-butyl-3-hydroxy-2,6-dimethylbenzyl)-1,3,5-triazine-2,4,6-(1H,3H, 5H)-trione]).

In order to provide a semiconducting composition it is necessary to incorporate conductive particles into the composition. These conductive particles are generally provided by particulate carbon black. Useful carbon blacks can have a surface area of about 50 to about 1000 square meters per gram. The surface area is determined under ASTM D 4820-93a (Multipoint B.E.T. Nitrogen Adsorption). The carbon black is used in the semiconducting shield composition in an amount of about 20 to about 60 percent by weight based on the weight of the composition, and is preferably used in an amount of about 25 to about 45 percent by weight. Examples of conductive carbon blacks are the grades described by ASTM N550, N472, N351, and N110, and acetylene black. Examples of semiconducting compositions are contained in U.S. Pat. Nos. 4,286,023, 4,612,139, and 5,556,697.

Examples of antioxidants are: hindered phenols such as tetrakis[methylene(3,5-di-tert-butyl-4-hydroxyhydrocinnamate)]methane, bis [(beta-(3,5-ditert-butyl-4-hydroxybenzyl)-methylcarboxyethyl)]sulphide, and thiodiethylene bis(3,5-di-tert-butyl-4-hydroxy hydrocinnamate); phosphites and phosphonites such as tris(2,4-di-tert-butylphenyl)phosphite and di-tert-butylphenyl-phosphonite; thioesters such as dilaurylthiodipropionate, dimyristylthiodipropionate, distearylthiodipropionate (DSTDP), and pentaerythritol tetrakis (B-laurylthiopropionate); various siloxanes; and various amines such as polymerized 2,2,4-trimethyl-1,2-dihydroquinoline, 4,4'-bis(alpha,alpha-dimethylbenzyl) diphenylamine, alkylated diphenylamines, and hindered amine light stabilizers. Additional examples can be found in Plastic Additives Handbook, Gachter et al, 1985. Antioxidants can be used in amounts of about 0.05 to about 5 percent by weight based on the weight of the composition. Generally, lower amounts can be used because the scorch inhibitor, which is in the composition of the invention, is an excellent process and heat stabilizer. The thioesters are preferred, especially DSTDP.

Under certain conditions, the thioester, may induce an acidic environment in the polymer matrix and under acidic conditions, water can be generated during the peroxide crosslinking process and the peroxide efficiency can decrease with storage time. The presence of water in the insulation is not desirable because it can form voids in the material and induce other concerns with respect to the material's electrical performance under high electrical stress conditions. The decrease of peroxide efficiency with storage time is not desirable because this imposes a limitation on the compound's shelf life. PCT patent application WO 99/21194 discloses that the use of specific N-substituted hindered amine stabilizers comprised of 2,2,6,6-tetramethylpiperidine at concentrations of 0.1 to 0.5 weight percent can be used to minimize the formation of water with sulfur containing antioxidants at levels of below 0.15 weight percent while maintaining acceptable heat aging performance. It is found that acid (induced/catalyzed) decomposition of the cumyl alcohol generated in the peroxide crosslinking process can be effectively inhibited by adding a small amount of a material that acts like a base. When crosslinking, using the combination of [1,3,5-tris(4-tert-butyl-3-hydroxy-2,6-dimethylbenzyl)-1,3,5-triazine-2,4,6-(1H,3H,5H)-trione] and DSTDP with an organic peroxide, the acid decomposition of the cumyl alcohol can be effectively minimized with very low levels of a HAS (hindered amine stabilizer), and these levels are much lower than discussed in PCT patent application WO 99/21194. It is found that the HAS concentration can be effective from levels of 0.002 to 0.1 percent by weight of the polymer. It has also been found that when using a HAS with the combination of [1,3,5-tris(4-tert-butyl-3-hydroxy-2,6-dimethylbenzyl)-1,3,5-triazine-2,4,6-(1H, 3H,5H)-trione] and DSTDP, subject composition is not limited to N-substituted hindered amine stabilizers comprised of 2,2,6,6-tetramethylpiperidines to have acceptable heat aging stability. Additionally, it has been found that this combination of [1,3,5-tris(4-tert-butyl-3-hydroxy-2,6-dimethylbenzyl)-1,3,5-triazine-2,4,6-(1H,3H,5H)-trione], DSTDP and very low HAS concentration provides the peroxide containing material with a long shelf life at elevated temperatures. An additional benefit of using a low HAS concentration is that it lowers the overall formulation cost.

Examples of preferred HAS compounds are (i) 1,6-hexanediamine, N,N'-bis(2,2,6,6,-tetramethyl-4-piperidinyl)-polymer with 2,4,6 trichloro-1,3,5triazine, reaction products with N-butyl-1-butanamine and N-butyl-2,2,6,6-tetramethyl-4-piperidinamine; (ii) poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]); and (iii) 1,6-hexaneidamine, N,N'-Bis(2,2,6,6-tetramethyl)-4-piperidinyl)-,polymers with 2,4-dichloro-6-(4-morpholinyl)-1,3,5-triazine. Another way of describing HAS (iii) is: Poly[(6-morpholino-s-triazine-2,4-diyl)[2,2,6,6-tetramethyl-4-piperidyl)imino]-hexamethylene [2,2,6,6-tetramethyl-4-piperidyl)imino]]. Other examples of HAS compounds can be found on pages 2 to 8 in Oxidation Inhibition in Organic Materials by J. Pospisil and P. P. Klemchuk, Volume II.

Advantages of the invention are low scorch; higher useful extrusion temperatures; longer extrusion run times; high crosslink density; less degradation during aging; less propensity for sweat out resulting from higher peroxide levels; under suitable conditions, higher throughput of wire or cable through the continuous vulcanizing oven; low moisture generation during crosslinking; less propensity for loss of peroxide efficiency during storage at 15 to 80 degrees C.; electrical properties suitable for cables rated for voltages from 1 to 500 kV; no requirement for excess peroxide or excess cure booster; very low degree of additive bloom during storage; long term high temperature storage stability, and long term heat aging.

At least three methods exist for quantifying the degree of crosslinking of the resin: (i) by "hot-set" (IEC 60502/60840/60540). This is accomplished by attaching a weight to the crosslinked composition in plaque form at 200° C. If the elongation is below 100 percent, the crosslink density is sufficient for industrial purposes. (ii) by decalin extractables (ASTM D 2765). The uncrosslinked portion of the polymer dissolves in the hot decalin solvent and the value is reported in percent by weight decalin extractables. A value below 30 percent and preferably less than 20 percent is judged to be acceptable. (iii) by rheometer, which checks the viscosity. The rheometer test procedure is described in U.S. Pat. No. 3,954,907. The first two methods are industry standards. The third method is a diagnostic tool particularly suitable for accurate screening and laboratory study.

The higher the extrusion temperature, the hotter the resin composition going into the CV tube to be crosslinked and, thus, the faster the cure rate, simply because the resin composition doesn't have to be heated up as much for the cure step. Additionally, provided that there is not a significant amount of scorching, a higher extrusion temperature results in greater throughput of polymer per unit time, leading to higher manufacturing productivity. Thus, all other things being equal, a scorch retardant composition enables higher extrusion temperatures and higher manufacturing productivity.

The term "surrounded" as it applies to a substrate being surrounded by an insulating composition, jacketing material, or other cable layer is considered to include extruding around the substrate; coating the substrate; or wrapping around the substrate as is well known by those skilled in the art. The substrate can include, for example, a core including a conductor or a bundle of conductors, or various underlying cable layers as noted above.

The patents, patent applications, and publications mentioned in this specification are incorporated by reference herein.

The invention is illustrated by the following examples.

EXAMPLES

An ethylene polymer is dry blended with the components listed in the Tables. The resulting dry blend is melt compounded on a laboratory twin screw extruder operating at a temperature of 200 degrees C. The extrudate is pelletized and then soaked with dicumyl peroxide to provide a polyethylene crosslinkable composition.

The ethylene polymer (referred to as PE) is a homopolymer of ethylene made by a high pressure process and having a density of 0.92 gram per cubic centimeter and a melt index of 2 grams per 10 minutes. Dicumyl peroxide is present in each composition in an amount sufficient to achieve an equivalent maximum torque to crosslink the ethylene polymer compositions to an equivalent crosslink density.

The amounts of components in the Tables are given in percent by weight.

Examples 1 to 10

Scorch Retardance

Examples 1 to 8 are embodiments of the invention. Examples 9 and 10 are comparative examples using commercial materials. Variables and results can be found in Table I.

TABLE I

| Components | 1 | 2 | 3 | 4 | 5 | 6 | 7 | 8 | 9 | 10 |
|---|---|---|---|---|---|---|---|---|---|---|
| PE | 97.84 | 98.03 | 98.025 | 98.02 | 98.025 | 98.02 | 98.025 | 98.02 | 98.00 | 98.15 |
| A | 0.23 | 0.14 | 0.14 | 0.14 | 0.14 | 0.14 | 0.14 | 0.14 | | |
| B | 0.23 | 0.23 | 0.23 | 0.23 | 0.23 | 0.23 | 0.23 | 0.23 | 0.18 | |
| C | | | | | | | | | | 0.18 |
| D | | | | | | | | | 0.18 | |
| E | | | 0.005 | 0.01 | | | | | | |
| F | | | | | 0.005 | 0.01 | | | | |
| G | | | | | | | 0.005 | 0.01 | | |
| H | 1.7 | 1.60 | 1.60 | 1.60 | 1.60 | 1.60 | 1.60 | 1.60 | 1.64 | 1.67 |
| Scorch Time at 140 C. | 70 | 60.4 | 59 | 57 | 59 | 55 | 53 | 56 | 44 | 60 |
| Maximum Torque MH | 3.09 | 2.96 | 2.93 | 2.95 | 2.99 | 2.99 | 2.94 | 3.06 | 3.00 | 3.00 |
| Cure Time | 3.7 | 3.8 | 3.9 | 3.8 | 3.7 | 3.9 | 3.8 | 3.8 | 3.7 | 3.8 |

Notes to Tables:
1. A = [1,3,5-tris(4-tert-butyl-3-hydroxy-2,6-dimethylbenzyl)-1,3,5-triazine-2,4,6-(1H,3H,5H)-trione].
2. B = distearylthiodipropionate.
3. C = 4,4 thiobis[2-(1,1 dimethylethyl)-5-methyl-phenol].
4. D = thiodiethylene bis(3,5-di-tert-butyl-4-hydroxyhydrocinnamate).
5. E = poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]).
6. F = 1,6-hexaneidamine, N,N'-Bis(2,2,6,6-tetramethyl)-4-piperidinyl)-,polymers with 2,4-dichloro-6-(4-morpholinyl)-1,3,5-triazine.
7. G = 1,6-hexanediamine, N,N'-bis(2,2,6,6,-tetramethyl-4-piperidinyl)-polymer with 2,4,6 trichloro-1,3, 5triazine, reaction products with N-butyl-1-butanamine and N-butyl-2,2,6,6-tetramethyl-4-piperidinamine.
8. H = dicumyl peroxide.
9. Scorch Time at 140 C. = the time, in minutes, for a rise of 1.0 inch-pound of torque over the minimum torque on the MDR*. It is representative of the material's propensity to scorch, with a higher scorch time representing a higher degree of scorch resistance.
10. Maximum torque MH = the maximum torque achieved during cure on the MDR* at 182 degrees C. It is representative of the degree of crosslink density achieved, and is reported in pound-inches.
11. Cure time is the time, in minutes, required to reach 90 percent of the maximum torque value on the MDR* at 182 degrees C. It is representative of the amount of time required to cure the formulation.

*The MDR is a moving die rheometer manufactured by Alpha Technologies and is operated using a 0.5 degree rotation arc. To compare the scorch retardance of two formulations, the formulations are tested at an equal crosslink density as indicated by the MDR's maximum torque MH at 182 degrees C. Examples 1 to 10 have such equal maximum torque levels. Examples 1 to 8 demonstrate that the combination of [1,3,5-tris(4-tert-butyl-3-hydroxy-2, 6-dimethylbenzyl)-1,3,5-triazine-2,4,6-(1H,3H,5H)-trione] and DSTDP with and without a low level of a hindered amine stabilizer has a scorch retardance better than comparative example 9 and comparable to comparative example 10, both of which are representative of commercially available materials. Additionally, the scorch retardance of the [1,3,5-tris(4-tert-butyl-3-hydroxy-2,6-dimethylbenzyl)-1,3, 5-triazine-2,4,6-(1H,3H,5H)-trione] and DSTDP system can be varied by changing the concentration of the [1,3,5-tris (4-tert-butyl-3-hydroxy-2,6-dimethylbenzyl)-1,3,5-triazine-2,4,6-(1H,3H,5H)-trione] as seen in examples 1 and 2. This improvement in scorch retardance is achieved without a loss of peroxide efficiency as seen by comparable peroxide concentrations being used to achieve a similar crosslink density as well as comparable cure times.

Examples 11 to 18

Heat Aging Properties

In examples 11 to 17, the heat aging performance of the [1,3,5-tris(4-tert-butyl-3-hydroxy-2,6-dimethylbenzyl)-1,3,5-triazine-2,4,6-(1H,3H,5H)-trione] and DSTDP combination with HAS concentrations at which an adverse effect of the HAS is not experienced is demonstrated. By using a low level of HAS, excellent heat aging stability is maintained. Example 18 is a comparative example showing the performance of a commercial material. Examples 11 to 17 demonstrate that the performance of [1,3,5-tris(4-tert-butyl-3-hydroxy-2,6-dimethylbenzyl)-1,3,5-triazine-2,4,6-(1H,3H,5H)-trione] and DSTDP with less than 0.02 percent by weight HAS meets the heat aging performance expected for commercial materials.

Variables and results can be found in Table II.

TABLE II

| Components | 11 | 12 | 13 | 14 | 15 | 16 | 17 | 18 |
|---|---|---|---|---|---|---|---|---|
| PE | 98.03 | 98.03 | 98.025 | 98.03 | 98.025 | 98.03 | 98.025 | 98.17 |
| A | 0.14 | 0.14 | 0.14 | 0.14 | 0.14 | 0.14 | 0.14 | |
| B | 0.23 | 0.23 | 0.23 | 0.23 | 0.23 | 0.23 | 0.23 | |
| C | | | | | | | | 0.18 |
| D | | | | | | | | |
| E | | 0.01 | 0.005 | | | | | |
| F | | | | 0.01 | 0.005 | | | |
| G | | | | | | 0.01 | 0.005 | |
| H | 1.6 | 1.6 | 1.6 | 1.6 | 1.6 | 1.6 | 16 | 1.65 |
| Aging at 150 C. 0 days | | | | | | | | |
| % retained tensile | 100 | 100 | 100 | 100 | 100 | 100 | 100 | 100 |
| % retained elongation | 100 | 100 | 100 | 100 | 100 | 100 | 100 | 100 |
| Aged at 150 C. 7 days | | | | | | | | |
| % retained tensile | 104 | 105 | 99 | 110 | 103 | 112 | 106 | 91 |
| % retained elongation | 103 | 106 | 103 | 106 | 105 | 106 | 107 | 104 |
| Aged at 150 C. 14 days | | | | | | | | |
| % retained tensile | 99 | 99 | 100 | 104 | 100 | 110 | 107 | 90 |
| % retained elongation | 103 | 103 | 104 | 104 | 103 | 105 | 103 | 100 |

Notes to Tables:
12. Percent retained tensile strength and percent retained elongation are measured after aging in air at 150 degrees C. for zero days, seven days, and two weeks under ASTM D-638. The percent is that of the original (unaged) tensile strength and elongation. It is desirable to have high retained tensile and elongation properties.

Examples 19 to 22

Electrical Insulating Properties

For insulating cables rated at voltages above 1 kV (kilovolt), it is desirable and it is specified by IEC 60502 that the electrical loss of the insulation as measured by its power factor be below 0.1 percent. Examples 19, 20, 21 and 22 indicate that too high of a HAS concentration increases the dissipation factor as measured at 110 degrees C. to an unacceptable level.

Variables and results can be found in Table III.

TABLE III

| Components | 19 | 20 | 21 | 22 |
|---|---|---|---|---|
| PE | 98.03 | 98.02 | 98.01 | 97.98 |
| B | 0.23 | 0.23 | 0.23 | 0.23 |
| A | 0.14 | 0.14 | 0.14 | 0.14 |
| G | | 0.01 | 0.02 | 0.05 |
| H | 1.6 | 1.6 | 1.6 | 1.6 |
| Dissipation Factor at 110 C. (%) | 0.03 | 0.02 | 0.02 | 0.118 |

Notes to Tables:
13. Dissipation Factor at 110 C. (%) is measured as follows: the specimens for dissipation factor testing are compression molded into a 50 mil thick slab, then crosslinked in a press for 15 to 20 minutes at a temperature of 180 to 190 degrees C. under pressure. The samples are then cooled to room temperature under pressure and a 3 ½ inch diameter disk is cut from the slab. The dissipation factor of the material is then measured on a Guildline ™ bridge following the procedures specified in ASTM D150 at a temperature of 110 degrees C.

Therefore, when using the combination of A, B, and G (HAS), it is preferable to keep the HAS concentration to a low level to minimize its influence on the dissipation factor as well as on the formulation cost. Examples 20 and 21 indicate that HAS concentrations around 0.02 percent by weight or lower are desirable.

Examples 23 to 31

Moisture Reduction Due to Acid During Peroxide Crosslinking

Examples 24 to 30 illustrate the invention. Examples 23 and 31 are comparative examples.

These examples demonstrate that the combination of A and B requires a very low level of a basic material such as a HAS to neutralize the acidic component. Additionally, it is observed that the acidic B component can be aggravated with extended storage at elevated storage temperatures. After storing the compounded material for 8 weeks at 50 degrees C., there is still a minimal amount of water generated during crosslinking in examples 24 to 30 while comparative example 23 has a higher level of water generated. This demonstrates the usefulness of the HAS additive at reducing the moisture generated during the crosslinking reaction to very low levels. HAS levels of 50 to 100 ppm are effective.

Variables and results can be found in Table IV.

TABLE IV

| Components | 23 | 24 | 25 | 26 | 27 | 28 | 29 | 30 | 31 |
|---|---|---|---|---|---|---|---|---|---|
| PE | 98.03 | 98.025 | 98.02 | 98.025 | 98.02 | 98.025 | 98.02 | 98.01 | 98.17 |
| A | 0.14 | 0.14 | 0.14 | 0.14 | 0.14 | 0.14 | 0.14 | 0.14 | |
| B | 0.23 | 0.23 | 0.23 | 0.23 | 0.23 | 0.23 | 0.23 | 0.23 | |
| C | | | | | | | | | 0.18 |
| D | | | | | | | | | |
| E | | 0.005 | 0.01 | | | | | | |
| F | | | | 0.005 | 0.01 | | | | |
| G | | | | | | 0.005 | 0.01 | 0.02 | |
| H | 1.60 | 1.60 | 1.60 | 1.60 | 1.60 | 1.60 | 1.60 | 1.60 | 1.65 |
| Moisture-ppm | | | | | | | | | |
| Initial | 243 | 24 | 9 | 27 | 29 | 22 | 18 | 14 | 11 |
| After aging 8 wks at 50 C. | 289 | 59 | 22 | 40 | 30 | 33 | 28 | 25 | 46 |

Notes to Tables:
14. The moisture from the crosslinking process is measured by the following procedure. Prior to measuring the moisture, the sample is dried for 16 hours at 50 degrees C. in a vacuum oven at 30 inches Hg. Prior to removing the sample from the vacuum oven, a Wabash ™ electric press is preheated to 220 degrees C. The sample is removed from the vacuum oven then pressed between Teflon ™ sheets at 220 degrees C. for 40 minutes at 30 tons pressure to crosslink the sample. The sample in the press is then quench cooled and removed from the press. Approximately, two grams of the crosslinked sample are used for measuring moisture. The moisture on the two gram sample is measured in a Mitsubishi ™ moisture meter (Model CA-02 / VA-02) after conditioning in the moisture meter for 10 minutes at 220 degrees C.

Examples 32 and 33

Storage Improvement

Examples 32 and 33 demonstrate the effectiveness of the low HAS concentration in reducing the loss of peroxide efficiency with storage.

The pellets are stored in an air circulating oven at 70 degrees C. Then, the samples are removed after 7 and 14 days. Maximum torque MH of the samples is measured at 182 degrees C. on an Alpha Technologies™ MDR. The maximum torque measured at 7 and 14 days after aging at 70 degrees C. is then expressed as a percentage of the maximum torque of the unconditioned material before it was conditioned in the oven. Example 33 demonstrates that a small amount of HAS is sufficient to stabilize the composition against the loss of peroxide efficiency.

Variables and results can be found in Table V.

TABLE V

| Components | 32 | 33 |
|---|---|---|
| PE | 98.03 | 98.02 |
| A | 0.14 | 0.14 |
| B | 0.23 | 0.23 |
| G | | 0.01 |
| H | 1.6 | 1.6 |
| Pellet aging at 70 C. % retained MH vs days | | |
| 0 | 100 | 100 |
| 7 | 91 | 95 |
| 14 | 81 | 94 |

Examples 34 to 37

Additive Sweatout

Examples 34 and 35 illustrate the invention. Examples 36 and 37 are comparative examples of commercial materials.

The sweat out levels of examples 34 and 35 are very low after storage at 50 degrees C. for 8 weeks.

Variables and results can be found in Table VI.

TABLE VI

| Components | 34 | 35 | 36 | 37 |
|---|---|---|---|---|
| PE | 98.03 | 97.98 | 97.99 | 98.22 |
| D | | | 0.18 | |
| B | 0.23 | 0.23 | 0.18 | |
| A | 0.14 | 0.14 | | |
| G | | 0.05 | | |
| C | | | | 0.18 |
| H | 1.6 | 1.6 | 1.65 | 1.6 |
| Additive sweatout (ppm) | | | | |
| 1 wk at 23 C. | 123 | 123 | 141 | 372 |
| Aged 16 weeks at 50 C. | 202 | 177 | 170 | 961 |

Notes to Tables:
15. The 1 wk (week) at 23 C. pelleted samples are aged in the laboratory for 1 week at 23 degrees C. after the formulation is compounded and pelletized.
16. The 16 weeks at 50 C. pelleted samples are aged in an air circulating oven for 16 weeks at 50 degrees C. after the formulation is compounded and pelletized.
17. Additive sweatout (ppm) is measured by the following procedure: after the samples are conditioned as outlined above, approximately 35 to 50 grams of the pelleted samples are immersed in 75 to 100 milliliters of methanol for 5 minutes to form a solution of methanol and additive. The pellets are decanted from the methanol solution. The methanol solution is injected into a (Hewlett Packard ™ 1090M high performance liquid chromatograph to quantify the additives in the methanol solution. The results reported parts per million are for the amount of the antioxidant additives removed from the pellet surface.

What is claimed is:
1. A composition comprising:
   (a) polyethylene;
   (b) as a scorch inhibitor, [1,3,5-tris(4-tert-butyl-3-hydroxy-2,6-dimethylbenzyl)-1,3,5-triazine-2,4,6-(1H,3H,5H)-trione];
   (c) a thioester;
   (d) a hindered amine stabilizer; and
   (e) an organic peroxide.
2. The composition defined in claim 1 wherein the scorch inhibitor is present in an amount of about 0.01 to about 1 part by weight based on 100 parts by weight of polyethylene.
3. The composition defined in claim 1 wherein the thioester is distearylthiodipropionate.

4. The composition defined in claim 1 wherein the hindered amine stabilizer is selected from the group consisting of (i) 1,6-hexanediamine, N,N'-bis(2,2,6,6,-tetramethyl-4-piperidinyl)-polymer with 2,4,6 trichloro-1,3,5triazine, reaction products with N-butyl-1-butanamine and N-butyl-2,2,6,6-tetramethyl-4-piperidinamine; (ii) poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]); and (iii) 1,6-hexaneidamine, N,N'-Bis(2,2,6,6-tetramethyl)-4-piperidinyl)-, polymers with 2,4-dichloro-6-(4-morpholinyl)-1,3,5-triazine.

5. The composition defined in claim 1 wherein the organic peroxide is present in an amount of about 0.4 to about 3 parts by weight based on 100 parts by weight of polyethylene.

6. The composition defined in claim 1 wherein, for each 100 parts by weight of polyethylene, the other components (b), (c), (d) and (e) are present as follows:
   (b) about 0.05 to about 0.3 part by weight;
   (c) about 0.10 to 0.3 part by weight;
   (d) about 0.004 to 0.025 part by weight; and
   (e) about 0.6 to about 2.0 parts by weight.

7. A cable comprising one or more electrical conductors or a core of electrical conductors, each conductor or core being surrounded by a composition comprising:
   (a) a crosslinked polyethylene;
   (b) as a scorch inhibitor,[1,3,5-tris(4-tert-butyl-3-hydroxy-2,6-dimethylbenzyl)-1,3,5-triazine-2,4,6-(1H,3H,5H)-trione];
   (c) a thioester; and
   (d) a hindered amine stabilizer.

8. The cable defined in claim 5 wherein, for each 100 parts by weight of polyethylene, there are about 0.01 to 1 part by weight of component (b).

9. The cable defined in claim 5 wherein the thioester is distearylthiodipropionate.

10. The cable defined in claim 5 wherein the hindered amine stabilizer is selected from the group consisting of (i) 1,6-hexanediamine, N,N'-bis(2,2,6,6,-tetramethyl-4-piperidinyl)-polymer with 2,4,6 trichloro-1,3,5triazine, reaction products with N-butyl-1-butanamine and N-butyl-2,2,6,6-tetramethyl-4-piperidinamine; (ii) poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]); and (iii) 1,6-hexaneidamine, N,N'-Bis(2,2,6,6-tetramethyl)-4-piperidinyl)-, polymers with 2,4-dichloro-6-(4-morpholinyl)-1,3,5-triazine.

11. A process for extrusion comprising extruding around one or more electrical conductors or a core of electrical conductors, at a temperature below the decomposition temperature of the organic peroxide, a composition comprising
   (a) polyethylene;
   (b) as a scorch inhibitor, [1,3,5-tris(4-tert-butyl-3-hydroxy-2,6-dimethylbenzyl)-1,3,5-triazine-2,4,6-(1H,3H,5H)-trione];
   (c) a thioester;
   (d) a hindered amine; and
   (e) an organic peroxide,
and curing the extrudate.

* * * * *